United States Patent [19]

Segredo et al.

[11] Patent Number: 4,600,347
[45] Date of Patent: Jul. 15, 1986

[54] DOUBLE SEAM TIGHTNESS MONITOR

[75] Inventors: Anthony F. Segredo, Bloomingdale; Richard E. Prendergast, Western Springs; Ralph E. Martin, Oak Lawn; Jack W. Pluister, Tinley Park, all of Ill.

[73] Assignee: Continental Can Company, Inc., Stamford, Conn.

[21] Appl. No.: 669,716

[22] Filed: Nov. 9, 1984

[51] Int. Cl.⁴ .................................................. B21D 51/32
[52] U.S. Cl. ........................................... 413/26; 413/6; 413/30; 72/19; 73/774
[58] Field of Search ............... 413/6, 3, 26, 30, 31; 73/774, 777; 72/11, 12, 19

[56] References Cited

U.S. PATENT DOCUMENTS 3,465,703 9/1969 Jantze ........................................ 413/30
4,205,617 6/1980 Chmielowiec ............................ 72/19

Primary Examiner—Leon Gilden
Attorney, Agent, or Firm—Charles E. Brown

[57] ABSTRACT

This relates to a double seam tightness monitor wherein the second operation track of a cam of a double seaming apparatus or can closing machine is modified so as to permit the high dwell portion of the lobe thereof to deflect under loading from the associated cam follower which forces the second operation roll against the double seam component. Suitable strain gauges are associated with the deformable cam track portion and these are coupled in a bridge having a voltage output which is directed to a microprocessor. The microprocessor is provided with selected inputs which in combination with the voltage input from the bridge may be utilized to provide various signals including a high force condition signal, a pass condition signal, and a low force condition signal. There may also be associated with the microprocessor a printer for identifying the station where an abnormal condition exists, the specific force of the abnormal condition, the machine number, the time and the date. There may also be an output signal from the microprocessor which may be observed in several customary manners so as to permit a complete monitoring of the forces effected during the repeated seaming operations. There may also be a fault indicator for indicating when the same fault occurs at the same station repeatedly for a preset number of cans. The monitoring operation is entirely automatic except for the resetting of the fault indicator and for the manual control of the printing of high and low forces for those stations which are forming double seams that are passable. This abstract is not to be construed as limiting the claims of the application.

21 Claims, 6 Drawing Figures

DOUBLE SEAM TIGHTNESS MONITOR

This invention relates in general to improvements in double seam forming can closing machines, and more particularly to a monitor system for determining the tightness of the formed double seams.

First of all, this invention relates to a double seaming machine of the type specifically disclosed in the patent to Jantze et al, U.S. Pat. No 3,465,703, granted Sept. 9, 1969. The machine of the Jantze et al patent is modified by modifying the cam 26 thereof.

When cans are closed in accordance with the known prior art as exemplified by the above-identified Jantze et al patent, the cans must have the double seams thereof individually checked for tightness. This is a time consuming operation and furthermore only a limited number of cans will be inspected.

In accordance with this invention it is proposed to provide the second seaming operation track of the cam with sensors which will be indicative of the load or force applied in the second seaming operation which, in turn, is directly indicative of the tightness of the seam.

The sensors carried by the cam track will be coupled to a monitoring system which will indicate when a high and/or low force is applied. The monitoring system will include a printer which will print when a high or low load condition exists and identify that station of the machine wherein the fault occurs. Further, the monitoring system may include a fault storage which, after a preselected number of faulty seams in sequence are formed at a particular station, will identify the faulty station for appropriate steps by the machine operator.

Most particularly, the cam lobe of the second operation track will be so separated from the remainder of the cam so as to be deformable in accordance with the reactive load applied thereto by the cam follower for a respective second operation roll.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
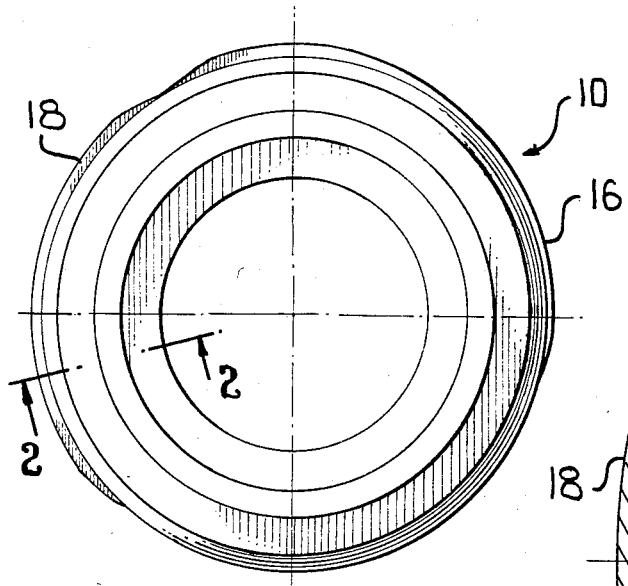
FIG. 1 is a plan view of the seaming cam.

Referring now to the drawings in detail, reference is first made to the Jantze et al patent, U.S. Pat. No. 3,465,703, wherein a typical can closing machine or double seaming apparatus is illustrated. The machine will have a main shaft and will be of the turret type. The machine of this invention is provided with eight stations although the number may vary and is not part of this invention. Each station is constructed to include a base on which a can is to be seated and an inner chuck which engages the end unit which is to be applied.

In the forming of a double seam there are two operations with the first operation being formed by a first operation roll and the second operation being formed separate and apart from the first operation by a second operation roll. The rolls are mounted for rotation and further are pivotable so that they may be moved radially inwardly relative to an assembled end unit and can body to effect the folding of the outer peripheral portion of the end unit and the seaming flange of the can body. The support for each of the seaming rolls carries a cam follower. Each cam follower for the first operation rolls engages a first track on the cam and each cam follower for the second operation rolls engages a second operation track on the cam.

The environment of this invention having been briefly described, reference is now made to the drawings.

Figure 2:
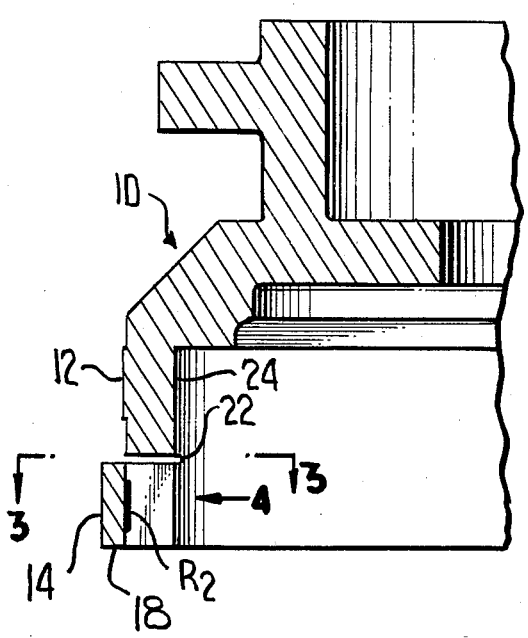
FIG. 2 is an enlarged fragmentary vertical sectional view taken generally along the line 2—2 of FIG. 1, and shows the specific cross section of the cam intermediate the second track lobe ends.

In FIG. 1 there is illustrated a typical double seam forming apparatus or can closing machine cam which is generally identified by the numeral 10. The cam 10 has, as is best shown in FIG. 2, an upper first operation track 12 and a lower second operation track 14. The first operation track 12 has a radially outwardly projecting lobe 16 while the second operation track 14 has a radially projecting lobe 18. Inasmuch as this invention relates to the monitoring of the tightness of the formed double seams, this invention relates solely to the modification of the cam 10 in the area of the second operation track 14 and more specifically in the area of the dwell portion 20 (FIG. 3) of the lobe 18.

Figure 3:
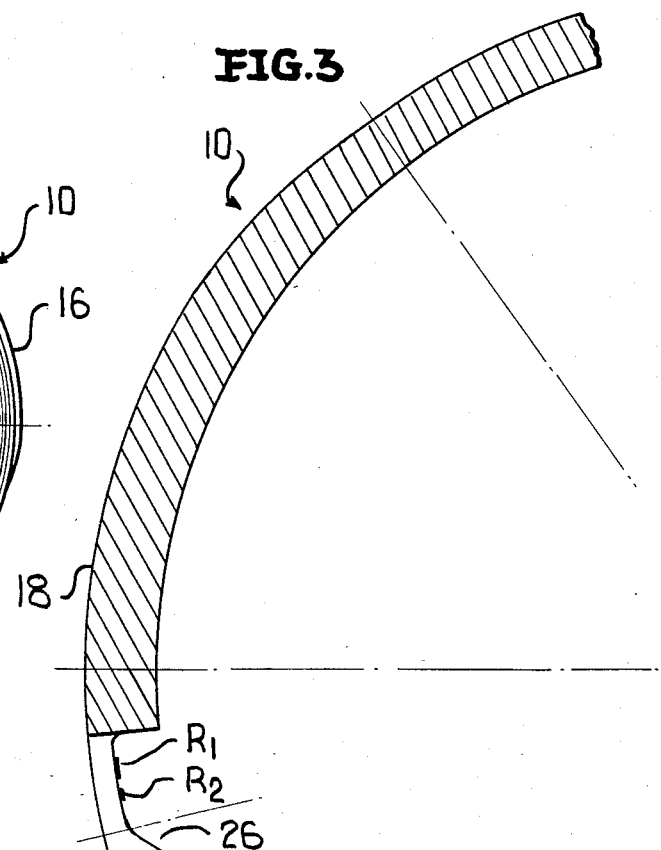
FIG. 3 is a fragmentary horizontal sectional view taken generally along the line 3—3 of FIG. 2, and shows the cross section of the cam along the second operation track lobe and the placement of sensors relative thereto.
Figure 4:
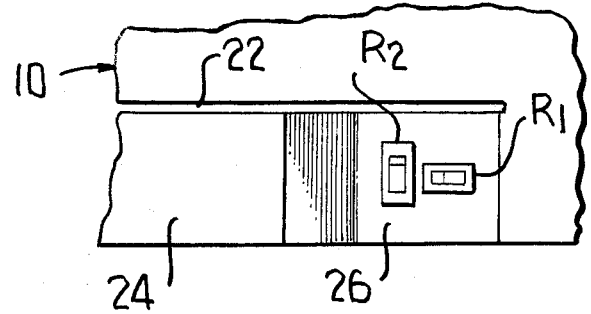
FIG. 4 is an enlarged fragmentary elevational view of the interior of the cam taken in the direction of the arrow 4 of FIG. 2, and shows more specifically the mounting of the sensors.

In accordance with this invention and as is clearly shown in FIGS. 2–4, the cam 10 is provided with a saw slit 22 formed horizontally and radially through the cam 10 in the high dwell area 20. The extent of this saw slit is best shown in FIG. 3.

Within the extent of the saw slit 22, a radially inner surface 24 of the cam 10 is formed with a pair of notches or recesses 26, 28. The machined notch 26 has mounted on the inner wall surface thereof a strain gauge R1 which is elongated in the circumferential direction. Also mounted on the inner surface of the machined notch 26 is a strain gauge R2 which is elongated in the axial direction.

A similar pair of strain gauges R3 and R4 are mounted on the inner surface of the machined notch 28. The strain gauge R3 is elongated in the axial direction while the strain gauge R4 is elongated in the circumferential direction. The orientation of the strain gauges R1 and R2 is shown in FIG. 4.

At this time it is pointed out that the strain gauges R1 and R4 are distorted by the deflection of the high dwell portion 20 of the second operation track 14 while the strain gauges R2, R3 relate to distortion of the overall high dwell portion due to temperature changes. The strain gauges R2, R3 will balance out for any temperature distortions when utilized in a bridge in a manner to be described hereinafter.

Figure 5:
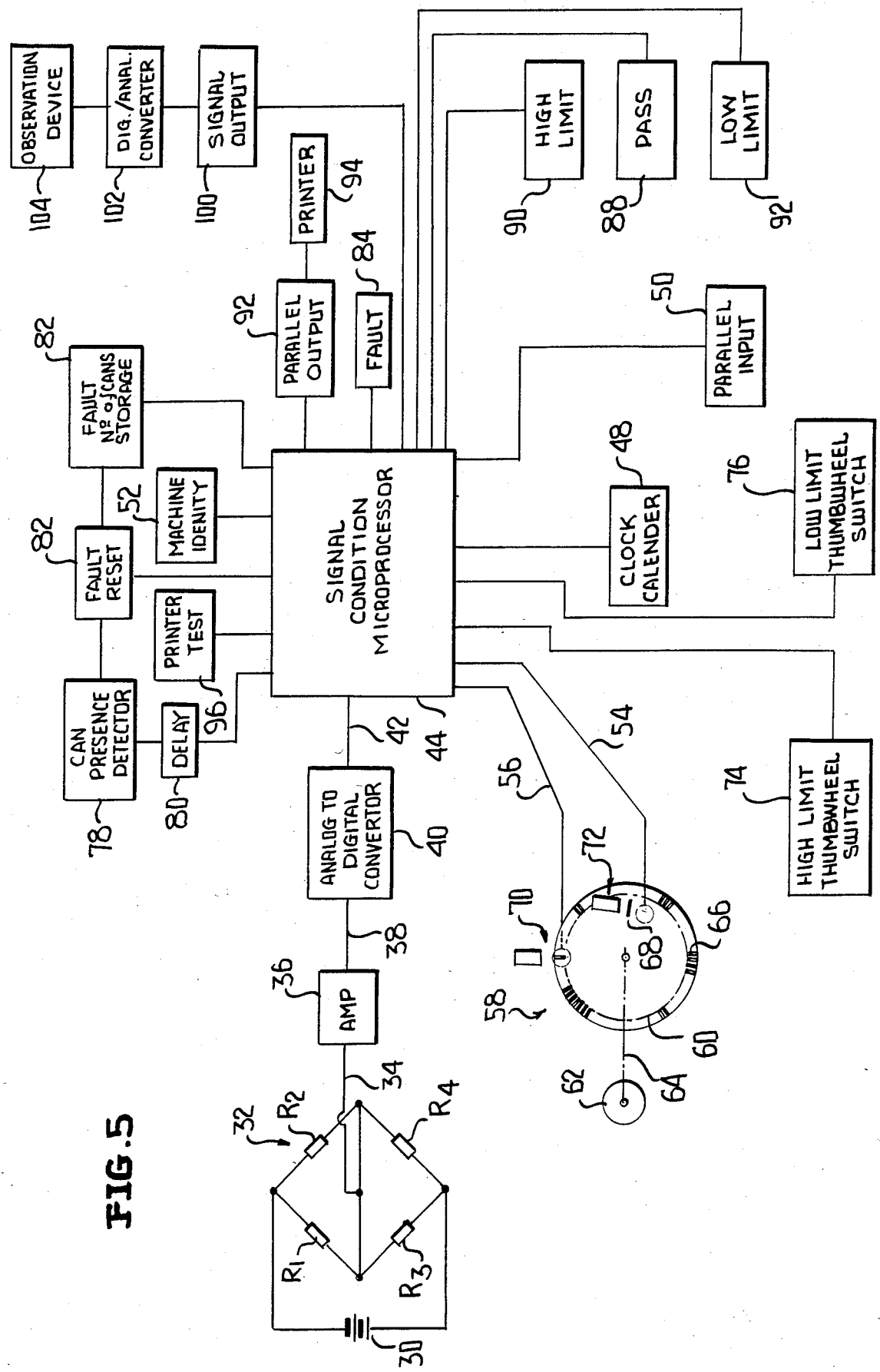
FIG. 5 is a wiring schematic of the monitoring system.

The strain gauges R1–R4 are conventional metal foil strain gauges and are mounted in an active bridge configuration as shown at the left of the wiring schematic of FIG. 5. There is is a power supply 30 coupled to two opposite corners of the bridge generally identified by the numeral 32, and the other two corners of the bridge 32 are coupled together to provide a voltage output in a line 34 leading to an amplifier 36. The amplifier 36 is coupled by means of a suitable line 38 to an analog to digital converter 40. The output of the converter 40 is connected by way of a line 42 to a signal condition microprocessor 44 of a conventional type.

The microprocessor 44 may be a CPU (central processing unit) CARD, a CLOCK CALENDAR CARD 48 and a PARALLEL INPUT CARD 50. It is to be understood that the CLOCK CALENDAR CARD will provide the time and date of the processing of a signal. There will also be a MACHINE IDENTIFICATION CARD 52 for identifying the machine which is being monitored by machine number.

The microprocessor will also receive two sets of pulses, one through a line 54 and the second through a line 56. The pulse 56 will be directed into the microprocessor at the rate of 1,000 pulses for each rotation of the machine. The microprocessor will also receive a single pulse through the line 54 for each rotation of the machine, the single pulse being in accordance with station 1 at the first pulse for that station. The pulses supplied to the microprocessor through the lines 54, 56 are provided by an encoder assembly 58 which includes a disk 60 driven from the machine main shaft 62 through a suitable drive 64 so as to rotate one time for each rotation of the shaft 62. The outer periphery of the disk 60 will be provided with 1,000 notches 66. There also will be a single radially inwardly disposed notch 68.

The 1,000 pulses per revolution are effected by a light transmitter and receiver pair 70 in accordance with the notches 66, while the single pulse per revolution will be supplied by a second light transmitter and receiver pair 72 in association with the single notch 68.

When the machine has eight stations, there will be 125 pulses per can. A typical can rotates 1.1 revolution per double seaming second operation, and during the double seaming second operation there will be involved on the order of sixty-six pulses so that the monitoring system, in effect, "looks at" the tightness of the seam sixty-six times per second operation double seaming.

It is desired that the monitoring system indicate when the force exceeds a preselected high or is below a preselected low. These limits are set into the microprocessor in an adjustable manner by a HIGH LIMIT THUMB WHEEL SWITCH 74 and a LOW LIMIT THUMB WHEEL SWITCH 76.

In order that there will be no indication of a low pressure at a station not having present thereat a can to be closed, upstream of the can closing machine will be a CAN PRESENT DETECTOR 78 which through a DELAY 80 will be timed into the microprocessor 44 at the time the respective station is being monitored.

The microprocessor will also be provided with a FAULT NUMBER OF CANS STORAGE 82. When a fault (high or low pressure) is determined at a particular station a fault signal for that particular station will be stored in the microprocessor. The STORAGE 82 will be set for a predetermined number of sequential faults, for example twenty. Thus when there is a fault at any one of the stations repeatedly for twenty cans, a FAULT SIGNAL INDICATOR 84 coupled to the output of the microprocessor 44 will be activated. The FAULT INDICATOR 84 has a latch at its output so as to remain active until it is reset. To this end the microprocessor 44 is provided with a FAULT RESET 86.

It is to be understood that as each station passes the high dwell portion of the second operation cam track 14, the deformation of the portion of the second operation cam track 14 will be monitored by the strain gauges R1-R4 at each pulse of the sixty-six pulses that will be emitted during the second operation seam forming step. If the monitored strain or force is within set limits, a PASS SIGNAL 88 will be actuated. If the monitored strain is above the high limit, the HIGH LIMIT INDICATOR 90 will be actuated. In a like manner, if the monitored strain is below a preset low limit the LOW LIMIT INDICATOR 92 will be actuated.

In the event at any time during the monitoring of a second operation seaming there is a monitored strain above or below the preset limits, a signal will be delivered from the microprocessor 44 through a PARALLEL OUTPUT BOARD 92 to a PRINTER 94. The PRINTER 94 will indicate the machine number, the time and date, the station, and the value of the over or under limit pressure. If a seaming operation is within the limits, there will be no printout.

On the other hand, if one wishes to review the high or low pressures for a second operation seaming which is within the limits, a printout may be obtained through the PRINTER 94 by energizing a PRINTER TEST CIRCUIT 96.

Further, if one wishes to observe the monitored strains through any type of observation device including, for example, an oscilloscope, a recorder or a fault meter, the monitored signals will result in an output from the microprocessor 44 through a line 98 to a SIGNAL OUTPUT 100 which is coupled to a DIGITAL TO ANALOG CONVERTER 102, the output of which may be coupled to the selected OBSERVATION DEVICE 104.

Normally the monitoring system will be mounted in a suitable cabinet (not shown) which will have a central panel which is provided with a high limit set pressure indicator and a low limit set pressure indicator. To one side of the central panel there will be, in sequence, a red light, a green light and a red light to correspond to the INDICATORS 90, 88 and 92, respectively. On the opposite side of the central panel there will be an upper red light which corresponds to the FAULT INDICATOR 84 and a lower yellow light which will indicate when the printer test is activated.

The panel will also be provided with a suitable ON/OFF switch.

Figure 6:
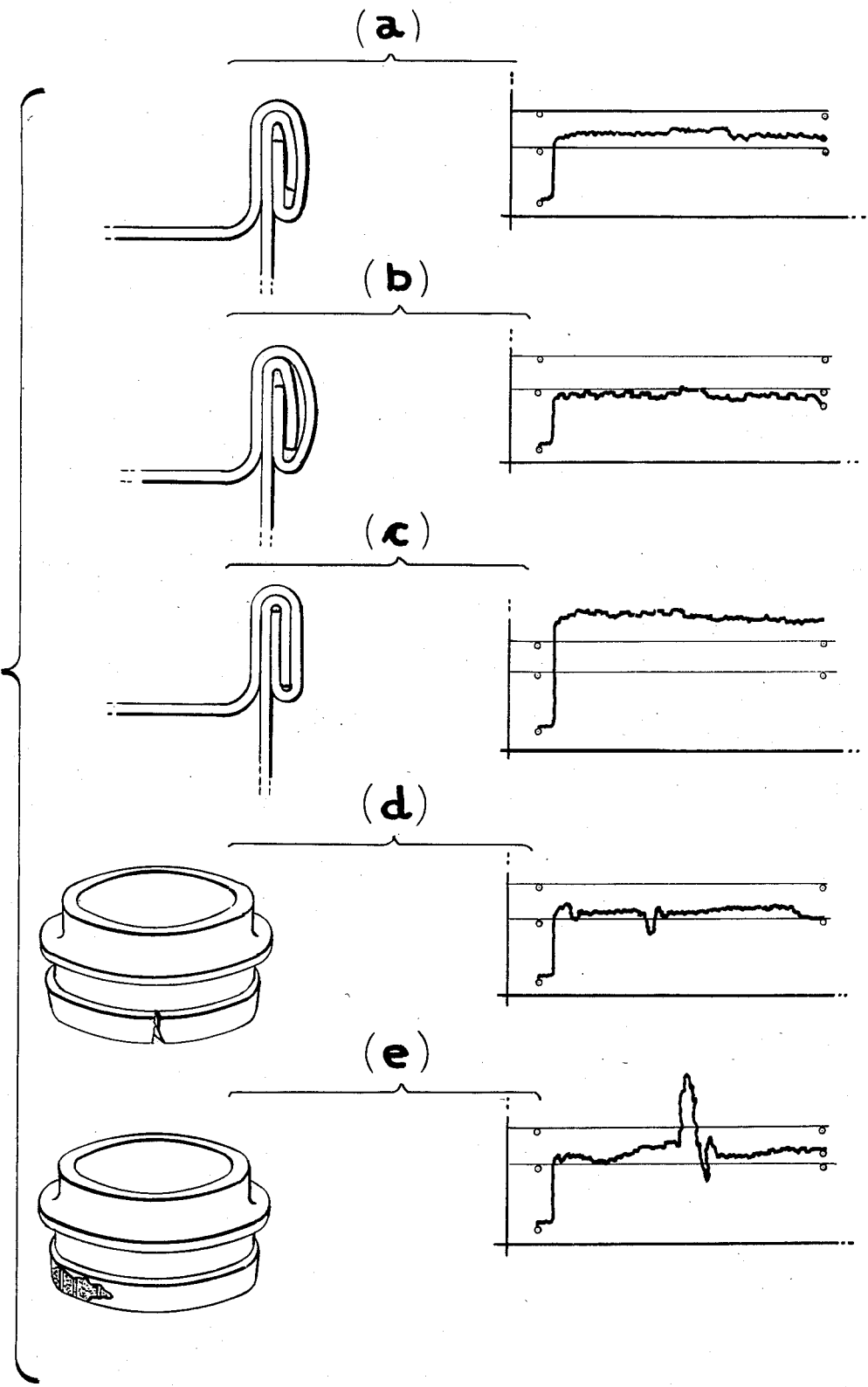
FIG. 6 is a schematic view showing the force curve of the second operation track under different conditions.

Reference is now made to FIG. 6 wherein typical conditions are illustrated. In FIG. 6a there is illustrated a typical passable double seam together with an illustration of the monitored force curve which will be between the two set limits. No printout will appear on the PRINTER 94 for this force curve.

In FIG. 6a there is illustrated a loose seam and it will be seen that the force curve is below the set lower limit. In such event there would be a printout as follows:

| MACHINE NO. 4 | | | | |
|---|---|---|---|---|
| Station No. | High Load | Low Load | Time | Date |
| 2 | | 275 | 08:32 | 10/07/84 |

With respect to FIG. 6c, there is illustrated an unduly tight seam and the force curve reflects this by being above the upper preset limit. A typical printout for the tight seam would appear as follows:

| MACHINE NO. 4 | | | | |
|---|---|---|---|---|
| Station No. | High Load | Low Load | Time | Date |
| 6 | 865 | | 10:14 | 10/07/84 |

In the event the double seam had a part which is loose and a part which is tight, the printout would indicate both the high load and the low load. On the other hand, if it is desired that the printout include both the high load and the low load even when the high load is below the low load standard or when the low load is above the high load standard, the microprocessor may be set to provide this dual printout.

With reference to FIG. 6d, there is illustrated a second operation roll which is broken and shows the tip in the force curve which would result from such a broken chuck.

In FIG. 6e there is illustrated a second operation chuck having a metal build-up thereon and the resultant force curve due to such metal build-up.

It is to be understood that during initial setup of the monitor the strain curve may be unduly distorted and adjustment may be required to bring about a true curve image. The microprocessor may be adjusted utilizing as the OBSERVATION DEVICE 104 an oscilloscope.

Although only a preferred embodiment of the invention has been specifically illustrated and described herein, it is to be understood that minor variations may be made in the tightness monitor without departing from the spirit and scope of the invention as defined by the appended claims.

We claim:

1. In a double seam forming mechanism for use in applying end units to can bodies, a cam including a second operation seaming cam track, said cam track having a seaming dwell portion, and said seaming dwell portion having attached thereto a strain gauge forming means for determining the pressure applied to said seaming dwell portion during a second seam forming operation as in indication of the seam tightness, said second operation seaming cam track at at least said seaming dwell portion being generally annular and having an inner surface, said inner surface having a radially outward relief to locally reduce the wall thickness of said seaming dwell portion, and said strain gauge being applied to said inner surface in the reduced wall thickness portion thereof.

2. A second operation seaming cam track according to claim 1 wherein said cam track at at least said seaming dwell portion is generally annular and has an inner surface, and said strain gauge is applied to said inner surface.

3. A second operation seaming cam track according to claim 1 wherein there is a second strain gauge, the first mentioned strain gauge extending in a circumferential direction for determining a radially applied force on said seaming dwell portion, and said second strain gauge extending in an axial direction for determining strains due to temperature variations.

4. A second operation seaming cam track according to claim 1 wherein said cam track at at least said seaming dwell portion is generally annular and has an inner surface, said inner surface having a radially outward relief to locally reduce the wall thickness of said seaming dwell portion, and said strain gauges being applied in adjacent relation to said inner surface in the reduced wall thickness portion thereof.

5. A second operation seaming cam track according to claim 3 wherein there are third and fourth strain gauges, and all said strain gauges are connected in a bridge with a voltage output.

6. A second operation seaming cam track according to claim 4 wherein there is a second radially outward relief in said inner surface, and said third and fourth strain gauges are applied to said inner surface in said second relief.

7. A second operation seaming cam track according to claim 6 wherein said track portion between said reliefs is axially separated from the remainder of said cam for independent deflection.

8. A second operation seaming cam track according to claim 1 wherein said seaming dwell portion is axially separate from the remainder of said cam.

9. A second operation seaming cam track according to claim 1 wherein said seaming dwell portion is axially separate from the remainder of said cam, said cam at said seaming dwell portion being generally annular and including a radially inner surface, there being a relief in said inner surface at each end of said axial separation, and there being one of said strain gauges seated in each of said reliefs.

10. A second operation seaming cam track according to claim 5 wherein there are monitoring means coupled to said bridge for receiving said voltage output and monitoring said voltage output to determine reaction forces on said seaming dwell portion and thus tightness of formed double seams.

11. The invention of claim 10 wherein said monitoring means includes a microprocessor having a multiple pulsed input timed in accordance with rotation of said double seam forming mechanism for providing a controlled provision of reaction force determination about a double seam as it is being formed.

12. The invention of claim 11 wherein said double seam forming mechanism includes a plurality of stations, and there is a single pulsed input to said microprocessor indicating a first pulse location of said multiple pulse input at a first of said stations to identify data by stations.

13. The invention of claim 11 wherein there is a clock and a calendar input to said microprocessor.

14. The invention of claim 11 wherein there is machine identifying input to said microprocessor.

15. The invention of claim 11 wherein there are means for providing said microprocessor with upper and lower force limits, and indicator means for indicating only when said limits are exceeded.

16. The invention according to claim 15 wherein said indicator means include a printer.

17. The invention according to claim 15 wherein said indicator means includes separate visual indicators for indicating a too high force, a too low force and a passing force.

18. The invention according to claim 11 wherein there is a fault storage and signal means for indicating when there is a preselected number of sequential faults.

19. The invention according to claim 11 wherein there is a fault storage and a signal means for indicating when there is a preselected number of sequential faults at any one of said stations.

20. The invention of claim 12 wherein there are means for providing said microprocessor with upper and lower force limits, and a printer for providing a printed record of each fault at each station including the faulty force.

21. The invention according to claim 11 together with a can presence detection upstream of said mechanism having a delayed input to said microprocessor for preventing an improper indication of a fault.

* * * * *

UNITED STATES PATENT AND TRADEMARK OFFICE
CERTIFICATE OF CORRECTION

PATENT NO.  : 4,600,347
DATED       : July 15, 1986
INVENTOR(S) : Anthony F. Segredo et al It is certified that error appears in the above-identified patent and that said Letters Patent is hereby corrected as shown below:

Item [75] add after "Tinley Park" -- Manuel Tiu Techico, Downers Grove --.

Signed and Sealed this

Twenty-eighth Day of October, 1986

[SEAL]

*Attest:*

DONALD J. QUIGG

*Attesting Officer*  *Commissioner of Patents and Trademarks*